April 16, 1968 C. W. YUNGBLUT ET AL 3,378,803
VARIABLE RESISTANCE DEVICE
Filed July 1, 1966 2 Sheets-Sheet 1

INVENTORS
LESLIE T. PEART
BY CHARLES W. YUNGBLUT
ATTORNEY

April 16, 1968  C. W. YUNGBLUT ET AL  3,378,803
VARIABLE RESISTANCE DEVICE

Filed July 1, 1966  2 Sheets-Sheet 2

INVENTORS
LESLIE T. PEART
BY CHARLES W. YUNGBLUT

Gerd L. Mehlhoff
ATTORNEY

United States Patent Office 3,378,803
Patented Apr. 16, 1968

3,378,803
VARIABLE RESISTANCE DEVICE
Charles W. Yungblut and Leslie T. Peart, Santa Ana, Calif., assignors to Beckman Instruments, Inc., a corporation of California
Filed July 1, 1966, Ser. No. 562,281
10 Claims. (Cl. 338—174)

ABSTRACT OF THE DISCLOSURE

A variable resistance device including an annular resistance element supported within a cavity of a housing in which there is mounted a rotatable wiper adapted to traverse a path over the resistance element. Stop means are provided within the housing for limiting the excursion of the wiper. An improved clutch arrangement is provided for permitting a clutch action between the rotatable wiper and the driving mechanism to prevent damage to the wiper or the driver mechanism when further excursion of the rotatable wiper is prevented by the stop means.

---

The present invention relates to rotary variable resistance devices and more particularly to a slip clutch arrangement for preventing damage to the driving components of such devices when the movable contact thereof reaches the limits of its rotational path.

The apparatus of the present invention is particularly applicable to miniature potentiometers of the type which include a housing enclosing an annular variable resistance element, a rotor, a movable contact and appropriate terminals for connecting the resistance element and contact with an external electrical circuit. Due to the fact that the element and the contact are contained within a substantially closed housing and are hidden from view, the operator cannot visually observe when the contact reaches the end of its excursion. Such potentiometers often have a stop means which engages the movable wiper and prevents it from advancing beyond a designated position. When a stop means is used to prevent movement of a contact, continued rotation of the driving mechanism may damage either the contact or the driving mechanism and result in permanent damage or impairment to the potentiometer or variable resistance device.

It is, therefore, an object of the present invention to provide an improved slip clutch arrangement in a variable resistance device which permits the driving mechanism to slip with respect to the wiper contact and its support mechanism when the wiper contact and its support mechanism are prevented from rotation by an appropriate stop means.

The advantages of the present invention will become apparent as the following description proceeds and the features of novelty which characterize the invention will be pointed out with particularity in the claims annexed to and forming a part of this specification.

Briefly, the present invention is directed to a variable resistance device in the form of a housing having end walls and side walls defining a cavity in which is mounted an annular resistance element. An electrically conductive rotatable wiper contact is rotatably supported within the housing and adapted to traverse a path over the resistance element. Stop means within the housing limit the excursion of the wiper and its support means and prevent rotation of the wiper contact beyond designated positions with respect to the resistance element. A driving mechanism is provided for rotating the wiper contact and its support member, and includes a resilient clutch member positioned between the driver and the contact support and adapted to drive the support member and its associated wiper contact until stopped, and then the clutch member slips relative to the contact support member or the driver mechanism on further rotation of the driving mechanism.

For a better understanding of the invention, reference may be had to the accompanying drawings in which.

Figure 3:
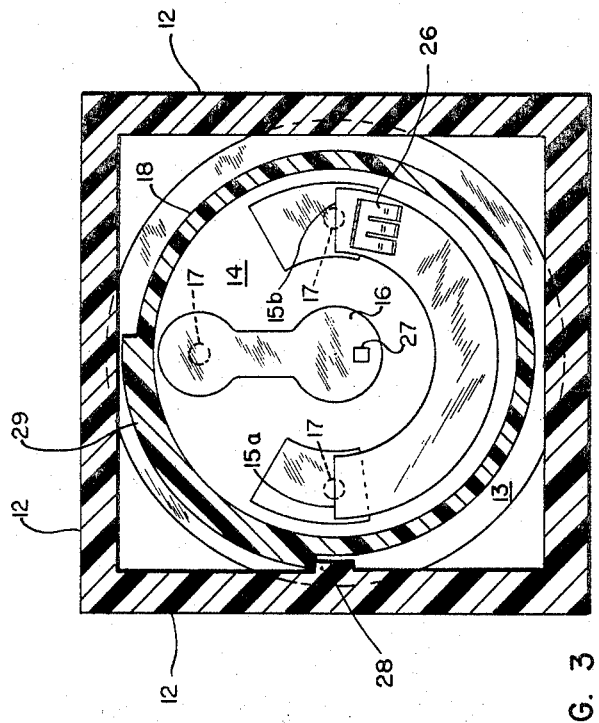
FIGURE 3 is a cross-sectional view of the variable resistance device taken substantially along line 3—3 of FIGURE 2.
Figure 2:
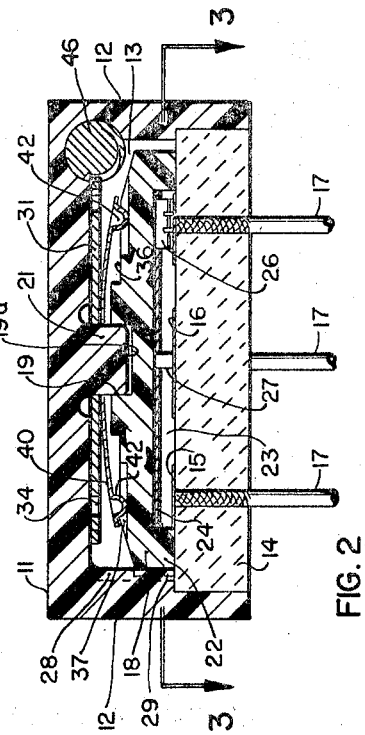
FIGURE 2 is a cross-sectional view of the variable resistance device taken along line 2—2 in FIGURE 1.
Figure 1:
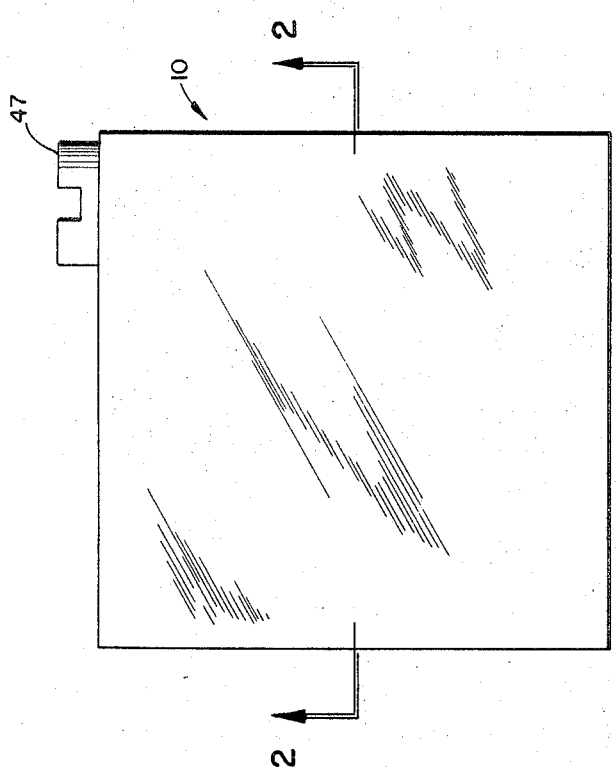
FIGURE 1 is a top view of a variable resistance device employing a worm gear driving mechanism having its head-end extending through a side wall of the housing.

Referring now to the drawings, there is shown in FIGURES 1–3, a variable resistance device of the type generally referred to as "trimmer" potentiometer. In the illustrated embodiment, the trimmer has a housing 10 of generally rectangular shape within which the operating components are enclosed. The housing has at least one end wall 11 and side walls 12 defining a cavity 13. The housing may be of any suitable material, such as plastic, or metal if suitable insulation is provided as needed. It is not essential that the housing be rectangular in shape and it may take on a circular or other type configuration.

Within the open end of the housing there is positioned a nonconductive base 14 having mounted thereon an annular shaped resistance element 15 and an electrically conductive collector element 16 (best seen in FIGURE 3) which may be arranged on the substrate or base member 14. In the embodiment illustrated in FIGS. 1–3, the base member 14 fully closes the open or lower end of the housing 10.

The resistance element 15 is in the form of a thin arcuate strip or layer of deposited material and may be of the type commonly referred to as a "cermet" resistance element. Such elements are fully disclosed in U.S. Patent Nos. 2,950,995 and 2,950,996 issued to T. M. Place, Sr., et al., and assigned to Beckman Instruments, Inc., the assignee of the present invention. The collector element 16 may typically comprise a thin disc of sheet metal fabricated or otherwise deposited on the base member 14. In the illustrated embodiment of the invention, there are three terminals, designated by reference numerals 17, employed to connect the resistance and collector elements respectively, into an external electrical circuit in which the variable resistance device is to be employed.

A rotor 18 is mounted within the cavity of the housing for rotational movement about an axis substantially conforming to the axis of the annular resistance element and collector elements. In the illustrated embodiment of the invention of FIGS. 1–3, the rotor is provided with an axially disposed bearing recess 19 adapted to receive a bearing post 21 which projects into the cavity from the end wall 11 of the housing. Bearing post 21 and the support recess 19 position the rotor within the cavity and permit rotational motion thereof about the axis of the bearing post 21. It should be noted that there is a small space 19a between the end of the bearing post and the bottom of the support recess 19 which permits a certain amount of axial play between the rotor and the bearing post and assures a reasonably loose axial fit between these members. The rotor 18 is preferably fabricated of a nonconductive material, such as molded epoxy resin, and in the preferred or illustrated embodiment includes a spacer means in the form of a lower cylindrical portion or flange 22 extending downwardly from the rotor. Flange 22 and the rotor form a cup-like cavity 23 adapted to receive an electrically conductive contact wiper element 24 which is rigidly attached to the rotor and adapted to rotate therewith. The electrical contact 24 may referably be formed in accordance with the teachings of U.S. patent application, Ser. No. 419,643, filed Dec. 21, 1964 by Ralph E. Mishler, and assigned to Beckman Instruments, Inc., the assignee of the present invention.

The wiper contact 24 is provided with one or more resilient wiper arms 26 and 27 (best seen in FIGURE 2) adapted to contact the collector element 16 and traverse the resistance element 15 during rotation of the rotor 18. The spacer means or flange 22 maintains the contact 24 at a fixed axial position above the resistance element and the collector and the separation and resilient force of the wiper arms 26 and 27 remains substantially the same during all adjustments of the potentiometer. As can be understood by reference to FIG. 2, any force applied to the rotor 18 is transmitted to the spacer means 22 which is retained in place by virtue of its abutting relation with the surface of the base member 14.

As will be seen in FIGURE 3, the resistance element 15 is arranged in a path forming a partial circular segment. While it is possible to bridge the space between the ends 15a and 15b of the resistance element, this is undesirable electrically for many types of circuits where the change in signal level will occur when the movable contact arm 26 moves directly from the one end of the resistance element to the other. In order to prevent rotation of the contact element and the wiper arm 26 completely around a 360° rotational path, stop means are affixed within the housing for engaging the rotor 18 and constraining the rotation of the rotor 18 when the wiper arm 26 reaches a predetermined position adjacent to or on the resistive track. In the illustrated embodiments of FIGS. 1–3, the stop means comprises a shoulder abutment 28 extending outwardly from a side wall of the housing and adapted to engage with a stop extension 29 which protrudes radially from the periphery of the rotor member. As may be seen in FIGURE 3, the stop extension 29 abuts against the stop shoulder 28 and prevents further rotation of the rotor in a counterclockwise direction. Similarly, when the rotor is moved in the clockwise direction, the stop extension 29 abuts against the opposite side of the shoulder 28 and prevents movement of the rotor 18, and its associated wiper contact 24, beyond a predetermined position. The end positions and the relative sizes of the stop means 28 and stop extension 29, of course, depend upon the relative locations of the ends of the resistance element and the desired limits of excursion of the conductive wiper arm 26.

Figure 4:
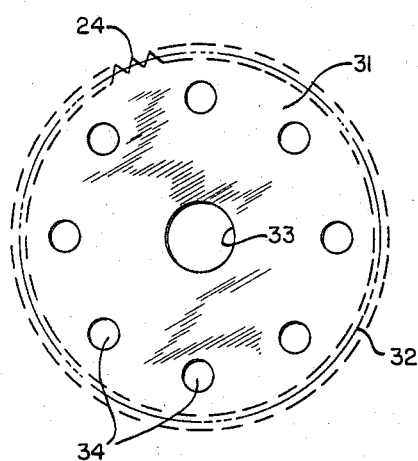
FIGURE 4 is a plan view illustrating a preferred driver member in the shape of a disc gear.

As will be hereinafter described, the invention includes an improved driver and clutch arrangement for positively driving the rotor around its rotational path within the housing yet permitting the driving mechanism to slip when the rotational motion of the rotor is constrained by the stop means. As may be seen in FIG. 2, there is provided a driver member 31 also mounted within a housing for rotation therein. As may be seen in FIGURE 4, a preferred embodiment of the driver comprises a disc shaped member having a plurality of gear teeth arranged around its periphery and including a centrally disposed bearing bore 33 adapted to support the driver disc 31 over the bearing post 21 for rotational motion within the cavity. The disc is provided with a plurality of depressions or holes 34 spaced radially from the bearing surface 33 and uniformly spaced around the disc-shaped member.

Figure 5:
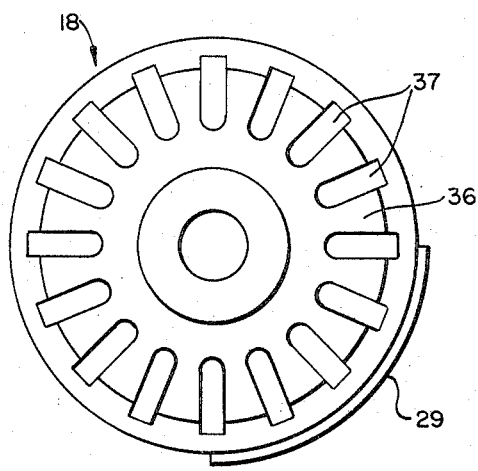
FIGURE 5 is a top view of the rotor illustrating depressions formed in the upper surface thereof.

As will be seen in FIGURES 2 and 5, the rotor 18 includes a surface or upper surface 36 which, in the illustrated embodiment, is arranged substantially normal to the bearing post 21. This surface faces the end wall 11 and the driver member 31 supported between the rotor and the end wall 11. A plurality of depressions in the form of radial slots 37 are formed in the upper surface of the rotor and are uniformly spaced around this surface.

Figures 6, 7, 8:
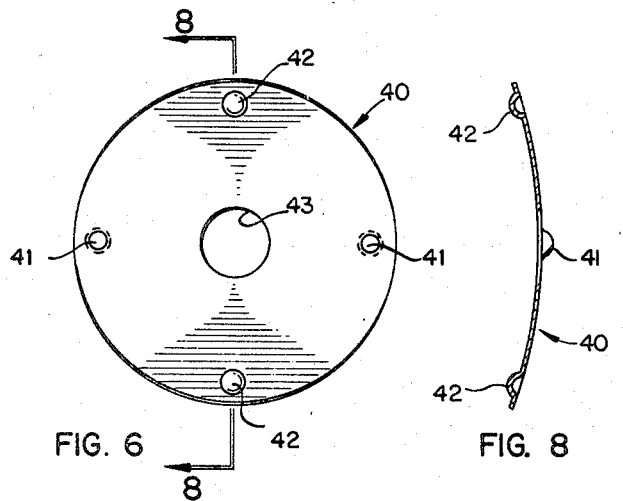
FIGURE 6 is a plan view of the bowed spring clutch.
FIGURE 7 is a top view of the bowed spring clutch illustrating the projecting detents therefrom.
FIGURE 8 is a cross-sectional view of the bowed spring clutch member.

As will be seen in FIGURE 2, a resilient clutch member 40 is positioned between the rotor 18 and the driver member 31. This member is in the form of a bowed spring and includes means, such as a plurality of protruding detents 41 and 42 adapted to grasp or extend into the depressions in the respective surfaces of the rotor and driver member. As will be seen in FIGURES 6, 7 and 8 the clutch spring 40 is preferably formed of a bowed disc shaped spring. The bowed clutch spring is provided with a central opening 43 adapted to position the clutch spring on the bearing post or hub 21. The clutch spring has one or more detents 41 and 42 projecting outwardly from opposite sides of the bowed sections of the spring and, as may be seen in FIGURE 2, these detents are adapted to mate with and fit into the depressions formed in the respective surfaces of the rotor and driver member. The clutch spring may be fabricated of a material such as beryllium-nickel alloy, resilient rubber material or any other suitable resilient material which exhibits appropriate resilient characteristics. It is desirable that the clutch spring member 40 have a spring force greater than the force of the resilient arms 26 and 27 of the contact member 24 so that the rotor is continuously retained against the surface of the base member 14.

Means externally of the housing 10 are provided for rotating the driver member 31 within the housing 10. In the illustrated embodiment shown in FIGURES 1–3, this means comprise a worm gear 46 journalled in a well-known manner through a side wall of the housing. Within the housing, the worm gear 46 engages with the gear segments 32 on the periphery of the driver member 31. Preferably, the worm gear 46 is provided with a slotted head 47 extending from the housing 10 and adapted to be rotated by a screwdriver or other appropriate instrument. Rotation of the worm gear 46 engages the gear segments 32 on the driver member causing the driver member to rotate about the bearing post 21. The openings 34 on the driver member are engaged by the detents 41 of the bowed clutch spring 40 so that the clutch spring rotates with the driver member 31. During rotation of the spring clutch 40, the projecting detents 42 engage the rotor slots 37 and move the rotor in accordance with the movement of the driver member 31. When the wiper 26 reaches the end of its excursion on the resistance element 15, the rotor extension 29 engages or abuts against the housing or stop member 28 and additional rotation of the rotor 18 is prevented. If the worm gear 46 is further actuated, the resiliency of the slip clutch spring 40 permits either the detents 42 or the detents 41 to disengage from the respective openings or slots in either the rotor member or the driver member, thereby disengaging these two members until the drive is discontinued in that particular direction or is reversed. Upon reversal of the direction of rotation of the worm 46, the rotor 18 is reversed in its rotational direction as soon as the detents 42 and 41 are engaged in their respective depressions in the driver member and the surface of the rotor. Obviously, the bowed spring clutch 40 may be inverted so that the detents 41 engage the rotor member and the detents 42 engage the driver member and the apparatus will operate effectively.

While the preferred arrangement employs a clutch spring 40 which is unattached to either the rotor member or the driver member, this clutch spring could be permanently attached to either the driver or the rotor and slip action would then occur only with respect to the other member. In such an arrangement it would probably be more desirable to make the spring clutch an integral part of the driver member.

Figure 9:
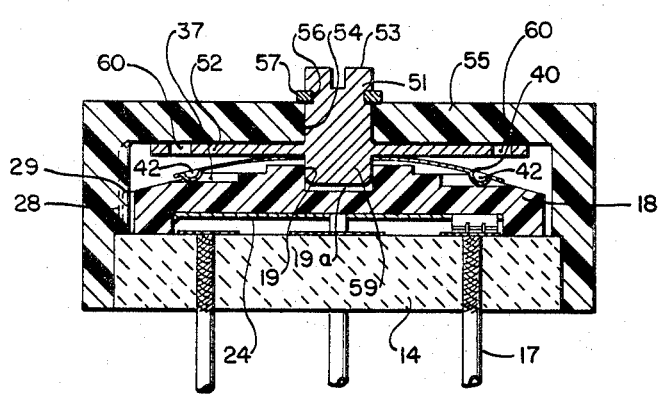
FIGURE 9 is a cross-sectional view similar to that of FIG. 2, illustrating another embodiment of the invention.

As may be seen in FIG. 9, there is shown another embodiment of the invention in which the means for operating the device externally of the housing is a driver stud 51 directly connecting with the disc-shaped drive member 52. Drive stud contains a slotted head 53 extending through an opening or bearing support 54 formed in the end wall 55 of the housing. The drive stud may be inserted into position prior to the insertion of the remaining components of the device and may be held in position by means of a spring clip 56 inserted within a slot 57 appropriately formed within the driver stud.

Drive disc or member 52 is rotatably positioned within the cavity 58 against the inner surface of the end wall 55. Protruding into the cavity from the lower side of the driver member and an extension therefrom is a bearing post or hub 59. This member extends into the bearing recess 19 of the rotor 18 somewhat similarly as in the embodiment shown in FIGS. 1–3 with the exception that, in this embodiment, the bearing post 59 rotates with the driver member. As in the embodiment of FIGS. 1–3, when rotor 18 is stopped by the stop shoulder 28 the projecting detents 41 or 42 of the clutch spring 40 slip out of the depressions 37 on the surface of the rotor or out of the holes or depressions 60 formed in the driver member 52. Thus, the driver member 52 may be rotated separately from the rotor 18 until rotation of the driver stud and driver member 52 is reversed when the clutch spring engages the depressions and again rotates the rotor 18.

While in accordance with the patent statutes there has been shown and described what at present are considered to be the preferred embodiments of the invention, it will be obvious to those skilled in the art that various changes and modifications may be made therein without departing from the invention, and it is, therefore, the intent of the appended claims to cover all such changes and modifications as fall within the true spirit and scope of the invention.

What is claimed is:

1. A variable resistance device comprising:
a housing including an end wall and at least one side wall defining a cavity;
a rotor member mounted within said cavity about an axis of rotation, said rotor having a stop extension protruding therefrom;
stop means rigidly affixed within said housing and so positioned and arranged as to engage said stop extension protruding from said rotor to limit rotational excursion of said rotor to less than 360°;
a base member supported within said cavity, said base member having an annular resistance element mounted thereon in spaced juxtaposed relation with respect to said rotor;
means for maintaining a fixed distance between said rotor and said resistance element on said base member;
an electrically conductive wiper contact attached to said rotor for rotation therewith, said contact having a resilient wiper arm extending into an electrically conductive engagement with said resistance element;
terminal means for connecting said resistance element and said wiper contact into an electrical circuit;
a driver member rotatably mounted in said cavity on said axis of rotation of said rotor, said driver member and said rotor member including spaced apart surfaces substantially facing each other, at least one of said surfaces having a plurality of spaced apart depressions therein arranged equidistance from said axis of rotation;
a resilient clutch member interposed between said driver member surface and said rotor member surface, said resilient clutch member being attached to one of said members and having resilient portions with protruding detents adapted to extend into said depressions on said one surface so that rotation of said driver member causes said protruding detents of said spring clutch member to engage with said depressions in said one surface and cause said rotor to rotate in either direction when said rotor stop extension is not engaged with said stop means; and
means accessible externally of said housing for rotating said driver member.

2. The variable resistance device defined in claim 1 in which said clutch spring member comprises a bowed disc spring attached to said driver member and is provided with projecting detents extending from peripheral portions thereof and adapte to dextend into the depressions formed in the surface of said rotor.

3. A variable resistance device comprising
a housing having an end wall and at least one side wall defining a cavity open at one end;
a bearing post extending into said cavity from said end wall of said housing;
a rotor having an axially disposed bearing recess adapted to support said rotor on said bearing post within said cavity for rotation within said cavity about said bearing post, said rotor having a stop extension protruding therefrom and a surface on one side of said rotor having a plurality of spaced apart depressions arranged therein and positioned equidistance from said bearing post;
stop means rigidly affixed within said housing and so positioned and arranged as to engage said stop extension protruding from said rotor to limit rotational excursion of said rotor to less than 360°;
a base member supported across said open end of said housing, said base member having an annular resistance element mounted thereon in spaced juxtaposed relation with respect to said rotor;
means for maintaining a fixed distance between said rotor and said resistance element on said base member;
an electrically conductive wiper contact attached to said rotor for rotation therewith, said contact having a resilient wiper arm extending into electrically conductive engagement with said resistance element;
terminal means for connecting said resistance element and said wiper contact into an electrical circuit;
a driver member rotatably mounted on said bearing post between said rotor and said end wall of said housing, said driver member including a surface thereon having a plurality of spaced apart depressions therein arranged at points equidistance from said bearing post;
a clutch spring member interposed between said driver member surface and said rotor surface, said clutch spring member having a plurality of protruding detents adapted to extend into said depressions on said respective surfaces so that rotation of said driver member causes said spring clutch member to rotate said rotor in either direction when said rotor extension is not engaged with said stop means; and
means accessible externally of said housing for rotating said driver member.

4. The variable resistance device defined in claim 3 in which said spring clutch member comprises a bowed disc spring with one portion abutting said surface of said driver member and opposite bowed portions abutting said surface of said rotor member and having projecting detents adapted to fit within said depressions in said surfaces.

5. A variable resistance device defined in claim 3 in which said respective surfaces of said rotor and said driver member are arranged in planes substantially parallel to each other and normal to the axis of rotation and said depressions in said surface of said rotor are radial slots positioned equidistance around the annular surface of said rotor member.

6. The resistance device defined in claim 3 in which said stop means comprises a shoulder abutment extending inwardly into said cavity from the inner surface of said housing and said stop extension protrudes radially from said rotor.

7. The variable resistance device defined in claim 3 in which said means for maintaining a fixed distance between said rotor and said resistance element on said base member comprises a cylindrical spacer section protruding from said rotor and abutting against a surface of said base member.

8. The variable resistance device defined in claim 3 in which said means for rotating said driver member comprises a worm screw journalled through a side wall of said housing and said driver member includes a plurality of gear teeth positioned around the periphery thereof and engaging said worm gear so that rotation of said worm gear causes said driver member to rotate thereby to move said spring clutch member and said rotor when said rotor stop extension is not engaged by said stop means.

9. A variable resistance device comprising
a housing having an end wall and at least one side wall defining a recess open at one end;
a bearing post extending into said recess from said end wall of said housing;
a rotor having an axially disposed bearing surface adapted to receive said bearing post and support said rotor for rotational motion within said cavity, said rotor having a flat surface thereon substantially normal to said bearing post and facing toward said end wall of said housing, said surface having a plurality of radial slots therein positioned equidistance apart around said surface, said rotor also having a stop extension protruding therefrom;
stop means within said housing so positioned and arranged as to engage said stop extension protruding from said rotor for limiting rotational excursion of said rotor to less than 360°;
a base member positioned within the open end of said housing, said base member having an annular resistance element and a collector element mounted thereon in spaced juxtaposed relation with respect to said rotor;
spacer means for maintaining a fixed distance between said rotor and said resistance and collector elements on said base member;
an electrically conductive wiper contact attached to said rotor for rotation therewith, said contact having a pair of resilient wiper arms extending respectively into electrically conductive engagement with said resistance element and said collector element;
terminal members electrically connecting with said resistance element and said collector element for connecting said resistance and said collector elements into an electrical circuit;
an annular driver member in the shape of a flat disc having a plurality of gear teeth around the periphery thereof, said driver member rotatably mounted within said cavity on said bearing post between said rotor and said end wall of said housing, said driver member including a flat surface thereon facing said rotor surface and having a plurality of spaced apart depressions therein arranged at points equidistant from said bearing post;
a clutch spring member interposed between said driver member surface and said rotor surface, said clutch spring member having a plurality of protruding detents adapted to extend into said depressions on said respective surfaces of said rotor and said driver member so that rotation of said driver member causes said spring clutch member to rotate said rotor in either direction when said rotor extension is not in engagement with said stop means; and
a worm gear journalled through a side wall of said housing and disposed in engagement with said gear teeth on said driver member for rotating said driver member.

10. The variable resistance device defined in claim 9 in which said clutch spring member is a bowed spring having sections thereof engaging respectively the opposed surfaces of said rotor and said driver member and having projecting detents adapted to extend into said slots and recesses formed into said respective surfaces.

References Cited

UNITED STATES PATENTS

| | | | |
|---|---|---|---|
| 2,669,833 | 2/1954 | Hill et al. | 338—174 |
| 3,127,583 | 3/1964 | Hudson et al. | 338—131 X |

ROBERT K. SCHAEFER, *Primary Examiner.*

H. HOHAUSER, *Assistant Examiner.*